United States Patent
Meembat

(10) Patent No.: US 9,525,897 B2
(45) Date of Patent: Dec. 20, 2016

(54) INSERTION OF A CONTENT ITEM TO A MEDIA STREAM

(71) Applicant: Exaget Oy, Helsinki (FI)

(72) Inventor: Shankar Meembat, Helsinki (FI)

(73) Assignee: Exaget Oy, Helsinki (FI)

( * ) Notice: Subject to any disclaimer, the term of this patent is extended or adjusted under 35 U.S.C. 154(b) by 10 days.

(21) Appl. No.: 14/723,484

(22) Filed: May 28, 2015

(65) Prior Publication Data

US 2015/0350694 A1    Dec. 3, 2015

(51) Int. Cl.
```
H04N 7/10       (2006.01)
H04N 21/236     (2011.01)
H04N 21/234     (2011.01)
H04N 21/235     (2011.01)
G11B 27/036     (2006.01)
H04N 21/439     (2011.01)
H04N 21/44      (2011.01)
H04N 21/45      (2011.01)
H04N 21/81      (2011.01)
```
(52) U.S. Cl.
CPC ........... *H04N 21/236* (2013.01); *G11B 27/036* (2013.01); *H04N 21/2353* (2013.01); *H04N 21/23424* (2013.01); *H04N 21/4394* (2013.01); *H04N 21/4396* (2013.01); *H04N 21/44016* (2013.01); *H04N 21/4524* (2013.01); *H04N 21/812* (2013.01)

(58) Field of Classification Search
CPC ... H04N 21/812; H04N 21/4532; H04N 7/165
USPC .............. 725/32–36, 134, 142; 709/231
See application file for complete search history.

(56) References Cited

U.S. PATENT DOCUMENTS

| | | | |
|---|---|---|---|
| 6,181,364 B1 * | 1/2001 | Ford | H04N 7/088 348/460 |
| 6,799,266 B1 * | 9/2004 | Stotzer | G06F 9/30156 712/219 |
| 7,123,696 B2 | 10/2006 | Lowe | |
| 7,269,836 B2 * | 9/2007 | Nogima | H04N 21/2181 348/E5.008 |
| 7,774,161 B2 * | 8/2010 | Tischer | G04F 10/00 348/552 |
| 7,822,381 B2 | 10/2010 | Mantel et al. | |

(Continued)

FOREIGN PATENT DOCUMENTS

| | | |
|---|---|---|
| WO | WO 02093552 A1 | 11/2002 |
| WO | WO 9952285 A1 | 11/2002 |
| WO | WO 2014018803 A1 | 1/2014 |

*Primary Examiner* — Annan Shang
(74) *Attorney, Agent, or Firm* — Seppo Laine Oy

(57) ABSTRACT

According to an example embodiment of the present invention, there is provided a method comprising obtaining a media stream, determining, based on at least two timing cues, a first location in the media stream, wherein the at least two timing cues are comprised in the following list: a metadata signal associated with the media stream, a silent period in the media stream and a predefined content sequence in the media stream, and inserting a predetermined content item into the media stream starting from or ending in the first location, to at least in part replace content originally in the media stream, wherein in case the metadata signal is comprised in the at least two timing cues, the first location occurs at most a threshold length of time before or after receipt of the metadata signal.

15 Claims, 5 Drawing Sheets

(56) References Cited

U.S. PATENT DOCUMENTS

| | | | |
|---|---|---|---|
| 8,325,795 B1* | 12/2012 | Goel | G11B 27/034 375/240.01 |
| 8,509,601 B2 | 8/2013 | Bhat et al. | |
| 8,566,867 B1* | 10/2013 | Yang | H04N 21/25891 725/32 |
| 9,148,707 B2* | 9/2015 | DiLorenzo | H04N 21/812 |
| 2002/0169540 A1 | 11/2002 | Engstrom | |
| 2003/0014310 A1 | 1/2003 | Jung et al. | |
| 2003/0023973 A1 | 1/2003 | Monson et al. | |
| 2003/0139966 A1 | 7/2003 | Sirota et al. | |
| 2004/0103429 A1* | 5/2004 | Carlucci | H04N 7/163 725/32 |
| 2004/0202148 A1* | 10/2004 | Kuehnel | H04J 3/1617 370/352 |
| 2005/0193410 A1 | 9/2005 | Eldering | |
| 2006/0190401 A1 | 8/2006 | Akadiri | |
| 2006/0277098 A1 | 12/2006 | Chung et al. | |
| 2007/0061201 A1 | 3/2007 | Ellis et al. | |
| 2007/0276726 A1 | 11/2007 | DiMatteo | |
| 2008/0040743 A1* | 2/2008 | Dharmaji | G06F 15/02 725/35 |
| 2009/0094092 A1 | 4/2009 | Hengel | |
| 2009/0106792 A1* | 4/2009 | Kan | H04N 7/17318 725/34 |
| 2009/0193453 A1* | 7/2009 | Cansler | H04N 21/4331 725/32 |
| 2009/0210899 A1* | 8/2009 | Lawrence-Apfelbaum | H04L 12/2801 725/34 |
| 2010/0107191 A1 | 4/2010 | Feng et al. | |
| 2010/0202390 A1* | 8/2010 | Lim | H04W 72/1289 370/329 |
| 2010/0208605 A1* | 8/2010 | Wang | H04L 47/19 370/252 |
| 2011/0138414 A1 | 6/2011 | Koren et al. | |
| 2012/0159575 A1* | 6/2012 | Fukui | H04L 9/0844 726/3 |
| 2013/0086601 A1* | 4/2013 | Adimatyam | H04N 21/23424 725/1 |
| 2013/0151634 A1* | 6/2013 | Selway | H04N 21/858 709/206 |
| 2013/0159673 A1* | 6/2013 | Pohlack | G06F 9/3842 712/208 |
| 2013/0212622 A1* | 8/2013 | Yang | H04N 21/4331 725/34 |
| 2014/0020013 A1* | 1/2014 | Dilorenzo | H04N 21/812 725/32 |
| 2014/0126612 A1* | 5/2014 | Tresidder | G06F 13/4273 375/145 |
| 2014/0189731 A1* | 7/2014 | Emerson, III | H04L 67/10 725/34 |

* cited by examiner

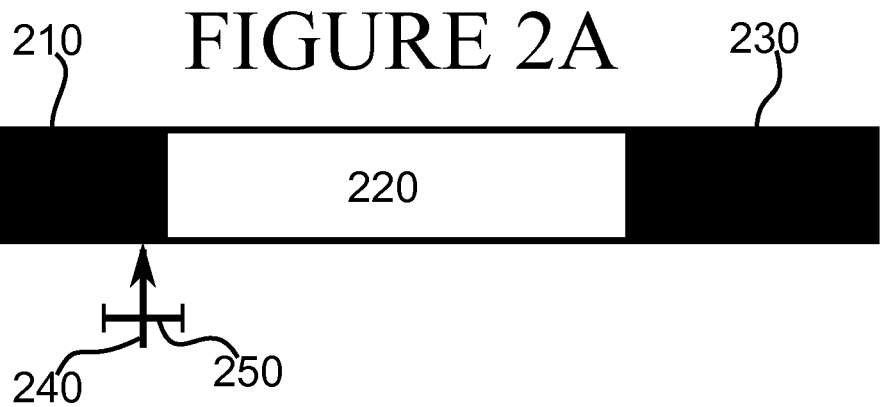
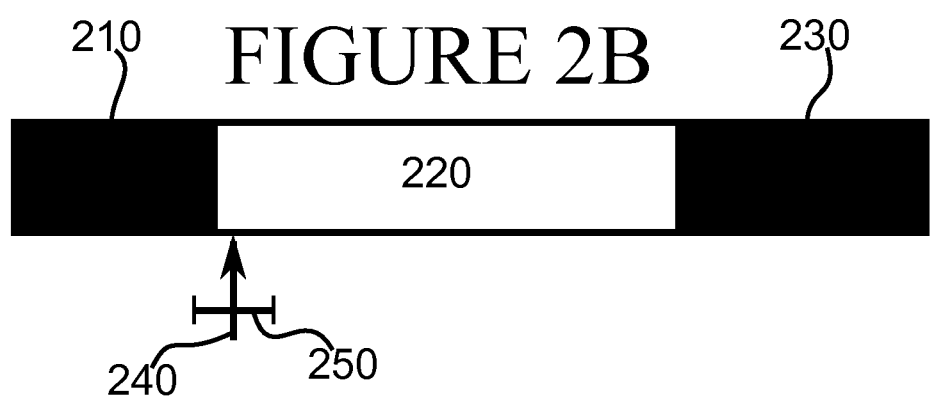
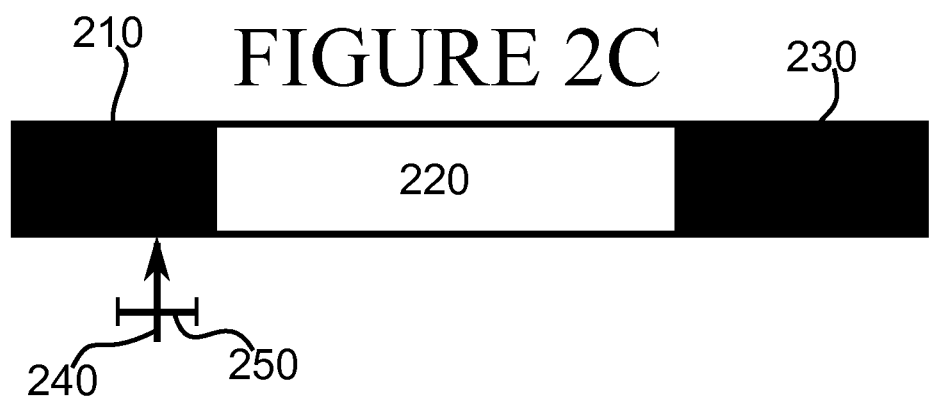

INSERTION OF A CONTENT ITEM TO A MEDIA STREAM

FIELD OF INVENTION

The present invention relates to the field of optimizing the synchronization of distributed content, to thereby increase its quality.

BACKGROUND OF INVENTION

Content, such as media content, may be distributed to recipients in various ways. For example, an audio content program may be disseminated by radio transmission, wherein the audio content program is transmitted from a radio station, conveyed modulated into radio waves, received in a receiver, demodulated and played over a loudspeaker comprised in the receiver device.

Content may be modulated into radio waves using analogue or digital modulation, wherein frequency modulation, FM, is an example of analogue modulation and quadrature amplitude modulation, QAM, for example QAM-16, is an example of digital modulation.

Using digital modulation, content may be streamed to digital receivers over an air interface. For example, a smartphone may receive an encoded content stream over a cellular or non-cellular air interface for presentation to a user. Alternatively, an encoded digital content stream may be conveyed over the Internet, for example, for presentation to a tablet, desktop or laptop computer user.

Content presented to a user may be compiled from more than one source item. For example, a content stream may be furnished with locally or personally relevant content items. A locally or personally relevant content item may be inserted in a content stream, for example where the content stream has an empty segment of known length, the empty segment may be filled with a locally relevant information bulletin.

An example is an industrial plant, wherein stream, such as for example a background music or informational stream, is furnished with locally relevant informative items. Such informative items may comprise, for example, safety update instructions, process instructions specific to sections of the industrial plant, or messages meant for specific persons. If the approximate location of the person is known, the message may be provided in an empty segment of the stream in the location where he is, and other content may be inserted in the empty segment of the stream in other locations.

Inserted content items may alternatively comprise advertisements tailored for specific geographically and/or demographically defined target audiences.

SUMMARY OF THE INVENTION

According to a first aspect of the present invention, there is provided a method comprising obtaining a media stream, determining, based on at least two timing cues, a first location in the media stream, wherein the at least two timing cues are comprised in the following list: a metadata signal associated with the media stream, a silent period in the media stream and a predefined content sequence in the media stream, and inserting a predetermined content item into the media stream starting from or ending in the first location, to at least in part replace content originally in the media stream, wherein in case the metadata signal is comprised in the at least two timing cues, the first location occurs at most a threshold length of time before or after receipt of the metadata signal.

Various embodiments of the first aspect may comprise at least one feature from the following bulleted list:
- the media stream is obtained as output from a media stream decoder
- the media stream is obtained in an apparatus configured to play the media stream
- selecting a value for the threshold length of time
- the value for the threshold length of time is selected at least in part in dependence of at least one of the following: stored information concerning a time span between metadata and insertion locations in the media stream in the past, presence of a valid cryptographic token in the metadata signal, an indicator comprised in the metadata signal and a connection type
- storing the predetermined content item in the apparatus
- buffering the media stream, and wherein the first location is determined in a buffered section of the media stream
- extracting the metadata from the media stream during decoding.

According to a second aspect of the present invention, there is provided a method comprising obtaining a media stream, receiving a metadata signal associated with the media stream, and responsive to the metadata signal determining whether a timing cue can be determined, the timing cue being comprised in the following list: a silent period in the media stream and a predefined content sequence in the media stream, and inserting a predetermined content item into the media stream starting from or ending in a point in the media stream corresponding to the timing cue, to at least in part replace content originally in the media stream responsive to the timing cue being determined and refraining from inserting the predetermined content item responsive to the timing cue not being determined, wherein, if determined, the timing cue occurs in the media stream at most a threshold length of time before or after receipt of the metadata signal.

According to a third aspect of the present invention, there is provided an apparatus comprising a receiver configured to obtain a media stream, at least one processing core configured to determine, based on at least two timing cues, a first location in the media stream, wherein the at least two timing cues are comprised in the following list: a metadata signal associated with the media stream, a silent period in the media stream and a predefined content sequence in the media stream, and to insert a predetermined content item into the media stream starting from or ending in the first location, to at least in part replace content originally in the media stream, wherein in case the metadata signal is comprised in the at least two timing cues, the first location occurs at most a threshold length of time before or after receipt of the metadata signal.

Various embodiments of the third aspect may comprise at least one feature from the following bulleted list:
- the media stream is obtained as output from a media stream decoder
- the metadata signal comprises at least one of an identifier of the media stream, an identifier of the apparatus, and identifier of a user of the apparatus and an identifier of a subscription associated with the apparatus
- the at least one processing core is further configured to select a value for the threshold length of time
- the at least one processing core is configured to select the value for the threshold length of time at least in part in dependence of at least one of the following: stored information concerning a time span between metadata and insertion locations in the media stream in the past, presence of a valid cryptographic token in the metadata signal, an indicator comprised in the metadata signal and a connection type the at least one processing core is further configured to cause storing of the predetermined content item in the apparatus the apparatus is further configured to buffer the media stream, and to determine the first location in a buffered section of the media stream the apparatus is further configured to extract the metadata from the media stream during decoding According to a fourth aspect of the present invention, there is provided an apparatus, comprising a receiver configured to obtain a media stream and a metadata signal associated with the media stream, at least one processing core configured to, responsive to the metadata signal, determine whether a timing cue can be determined, the timing cue being comprised in the following list: a silent period in the media stream and a predefined content sequence in the media stream, and insert a predetermined content item into the media stream starting from or ending in a point in the media stream corresponding to the timing cue, to at least in part replace content originally in the media stream responsive to the timing cue being determined and to refrain from inserting the predetermined content item responsive to the timing cue not being determined, wherein, if determined, the timing cue occurs in the media stream at most a threshold length of time before or after receipt of the metadata signal.

According to a fifth aspect of the present invention, there is provided an apparatus comprising means for obtaining a media stream, means for determining, based on at least two timing cues, a first location in the media stream, wherein the at least two timing cues are comprised in the following list: a metadata signal associated with the media stream, a silent period in the media stream and a predefined content sequence in the media stream, and means for inserting a predetermined content item into the media stream starting from or ending in the first location, to at least in part replace content originally in the media stream, wherein in case the metadata signal is comprised in the at least two timing cues, the first location occurs at most a threshold length of time before or after receipt of the metadata signal According to a sixth aspect of the present invention, there is provided an apparatus comprising means for obtaining a media stream, means for receiving a metadata signal associated with the media stream, and for, responsive to the metadata signal, determining whether a timing cue can be determined, the timing cue being comprised in the following list: a silent period in the media stream and a predefined content sequence in the media stream, and means for inserting a predetermined content item into the media stream starting from or ending in a point in the media stream corresponding to the timing cue, to at least in part replace content originally in the media stream responsive to the timing cue being determined and refraining from inserting the predetermined content item responsive to the timing cue not being determined, wherein, if determined, the timing cue occurs in the media stream at most a threshold length of time before or after receipt of the metadata signal.

According to a seventh aspect of the present invention, there is provided a non-transitory computer readable medium having stored thereon a set of computer readable instructions that, when executed by at least one processor, cause an apparatus to at least obtain a media stream, determine, based on at least two timing cues, a first location in the media stream, wherein the at least two timing cues are comprised in the following list: a metadata signal associated with the media stream, a silent period in the media stream and a predefined content sequence in the media stream, and insert a predetermined content item into the media stream starting from or ending in the first location, to at least in part replace content originally in the media stream, wherein in case the metadata signal is comprised in the at least two timing cues, the first location occurs at most a threshold length of time before or after receipt of the metadata signal.

According to an eighth aspect of the present invention, there is provided a non-transitory computer readable medium having stored thereon a set of computer readable instructions that, when executed by at least one processor, cause an apparatus to at least obtain a media stream, receive a metadata signal associated with the media stream, and responsive to the metadata signal, determine whether a timing cue can be determined, the timing cue being comprised in the following list: a silent period in the media stream and a predefined content sequence in the media stream, and insert a predetermined content item into the media stream starting from or ending in a point in the media stream corresponding to the timing cue, to at least in part replace content originally in the media stream responsive to the timing cue being determined and refrain from inserting the predetermined content item responsive to the timing cue not being determined, wherein, if determined, the timing cue occurs in the media stream at most a threshold length of time before or after receipt of the metadata signal.

INDUSTRIAL APPLICABILITY

At least some embodiments of the present invention find industrial application in synchronization of content insertion in content streams.

BRIEF DESCRIPTION OF THE DRAWINGS

FIGS. 2A-2C illustrate synchronization of insertion according to at least some embodiments of the present invention;

DETAILED DESCRIPTION OF EXAMPLE EMBODIMENTS

Using a plurality of timing cues may improve the accuracy of insertion of content items into a stream of media content, such as for example personal messages or advertisements into an audio broadcast stream. Accurately inserted content items may produce a resulting stream that is free of gaps and has no overwritten content parts. Such insertion may take place in an end-user device to facilitate more locally controlled content item insertion. Insertable content items may comprise predetermined content items.

Figure 1:
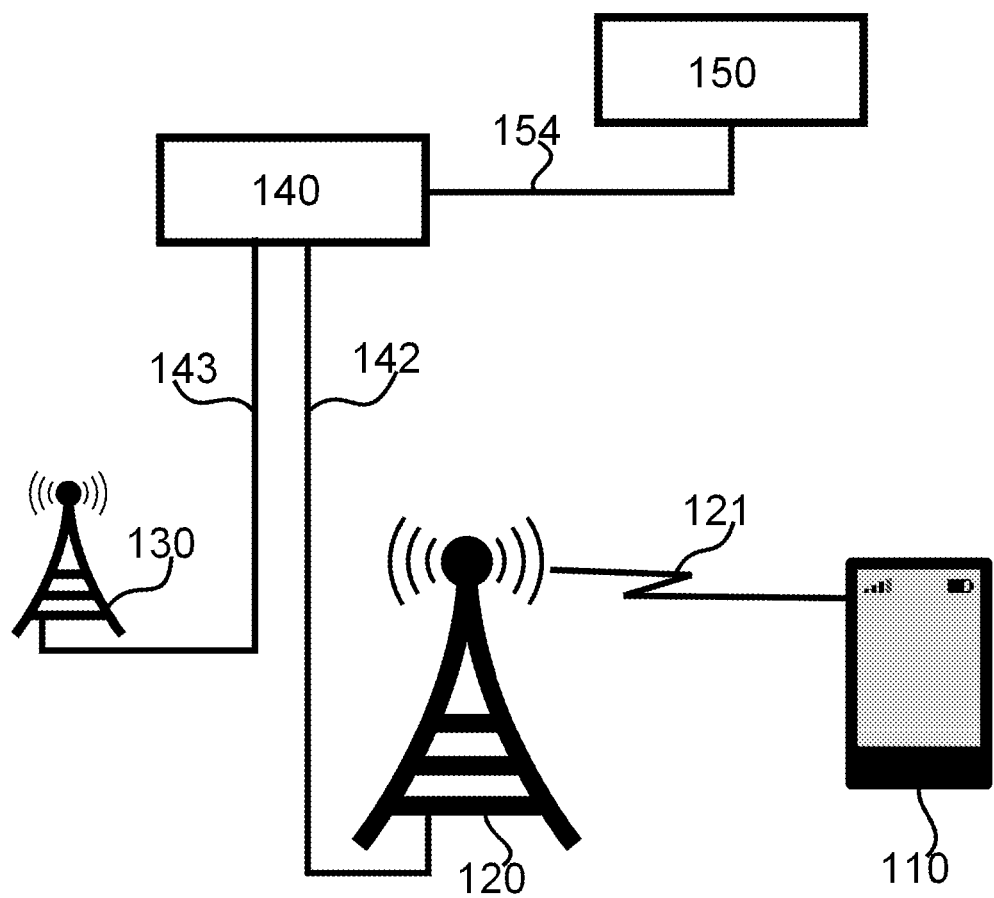
FIG. 1 illustrates a first example system capable of supporting at least some embodiments of the present invention.

FIG. 1 illustrates a first example system capable of supporting at least some embodiments of the present invention. FIG. 1 illustrates device 110, which may comprise a user or consumer device, such as for example a digital radio, smartphone, tablet or laptop computer or other device capable of receiving a media stream, such as for example a digital media stream. A media stream may comprise, for example, the contents of a frequency modulated signal. A media stream may comprise, for example, a digitally encoded media stream. Device 110 is communicatively coupled, via air interface 121, to base station 120.

Base station 120 may comprise a cellular or non-cellular base station. Base station 120 may comprise a radio station transmitter. A non-cellular base station may be referred to as an access point, but the term base station is used hereinafter for the sake of clarity. Base station 120 may be arranged to operate in accordance with a cellular communication standard, such as for example wideband code division multiple access, WCDMA, or long term evolution, LTE. Base station 120 may be arranged to operate in accordance with a non-cellular communication standard, such as for example wireless local area network, WLAN, also known as Wi-Fi, or worldwide interoperability for microwave access, WiMAX. Base station 120 may be configured to establish wireless links with mobile devices in accordance with any standard or standards base station 120 is arranged to operate in accordance with.

Wireless link 121 may operate in accordance with a wireless standard that both device 110 and base station 120 are configured to support. Wireless link 121 may comprise an uplink for conveying information from device 110 to base station 120. Wireless link 121 may comprise a downlink for conveying information from base station 120 to device 110. Wireless link 121 may be arranged to operate in accordance with principles such as time division multiple access TDMA, code division multiple access, CDMA, or WLAN principles, for example. Device 110 may be configured to seek attachment to a cell controlled by base station 120 when disposed inside a cell coverage area of such a cell. Although illustrated in FIG. 1 as connected via wireless link 121, in some embodiments of the invention device 110 has a wire-line connection to base station 120.

Base station 120 may be coupled, via connection 142, to controller 140. Controller 140 may be configured to control one base station or a plurality of base stations, such as base station 120 and base station 130. Base station 130 may be controlled by controller 140 via connection 143. Controlling a base station may comprise, for example, providing the base station with content to transmit and/or causing the base station to cease transmission. Controller 140 may comprise a radio station control centre that distributes content for transmission via the station's transmitter network. Such a transmitter network is illustrated in FIGURE is as base station 120 and base station 130. Controller 140 may alternatively comprise a radio network controller device, such as for example a radio network controller, RNC, in accordance with the WCDMA standard.

Device 110 may also be connected to nodes, such as for example controller 140, via a different route than that illustrated in FIG. 1, for example device 110 may have a wire-line Internet connection, and controller 140 may be configured to provide a media stream via the Internet.

Server 150 is illustrated in FIG. 1 as being communicatively coupled to controller 140 via connection 154. Server 150 may be configured to provide a media stream to controller 140, for controller 140 to transmit further via its transmitter network or set of cellular or non-cellular base stations. Server 150 may include in the media stream opportunities for inserting content items of limited duration, such that for the duration of the opportunity the content of the media stream is determined by the content item. For example, the media stream may comprise silent periods, during which advertisements may be inserted into the media stream, to produce thereby a modified media stream comprising content from server 150 and advertisements inserted into the silent periods. Advertisements are, as described above, only one example of insertable content items. In some embodiments, server 150 and controller 140 are co-located and/or comprised in one physical device. In other embodiments, they are distinct in that server 150 is external to controller 140 and controller 140 is external to server 150.

Server 150 may be configured to provide to provide to device 110 at least one insertable content item. The at least one insertable content item may be delivered from server 150 to device via connection 154, controller 140, connection 142, base station 120 and air interface 121, for example. Alternatively, the at least one insertable content item may be delivered to device 110 via another route. Server 150 may deliver the at least one insertable content item via another route. The at least one insertable content item need not originate from, or traverse, server 150. In some embodiments, a further node, not illustrated in FIG. 1, or controller 140 is configured to provide device 110 with at least one insertable content item. Device 110 may comprise a further connection, which is not illustrated in FIG. 1, via which device 110 may receive the at least one insertable content item, be it sent from server 150 or from the further node.

When device 110 stores the at least one insertable content item and receives the media stream, device 110 may determine a location in the media stream, where to begin inserting one of the at least one insertable content item. Device 110 may be configured to determine the location based on timing cues, for example a metadata signal may be received in device 110 to mark the location where insertion may begin, so that a user of device 110 can perceive a continuous media stream where the transition in playback from the received media stream to the inserted content item is smooth and as imperceptible as possible. A metadata signal may comprise information on a length of a section of the media stream, such as for example a silent period or an advertisement, that is suitable for being overwritten by inserting the content item. Device 110 may use this information when selecting a content item from among the at least one insertable content item available in device 110 for insertion. A metadata signal may be comprised in the media stream, or it may be delivered to device 110 separately from the media stream, either via air interface 121 or via another interface, not illustrated in FIG. 1.

Another example of a timing cue is a silent period in the media stream. Device 110 may monitor a volume level of the media stream after decoding, to determine when the media stream is substantially devoid of content. The beginning of such a silent period may be used to begin inserting the content item, so as to fill the silent period with content. A yet further example of a timing cue is a predetermined signal comprised in the media stream, such as for example a predetermined digital code comprised in an encoded version of the media stream, received in device 110 via air interface 121. Using more than one timing cue may result in more accurate synchronization between the inserting and the beginning of an opportunity for inserting.

Connections 154, 143 and 142 may comprise wire-line connections, for example.

FIGS. 2A-2C illustrate synchronization of insertion according to at least some embodiments of the present invention. In these figures, time advances from left to right. Section 210 of a media stream is content that it not meant to be written over by inserting a content item in device 110. Section 220 of the media stream is meant to be, or may be, written over by inserting a content item in device 110.

Section 230 is not meant to be written over. One can imagine section 220 to represent an advertisement break, or a break for personal messages, or locally relevant safety bulletins, for example.

Metadata signal 240 is associated with search window 250. Device 110 may be configured to, responsive to receipt of metadata signal 240, search for a timing cue, such as a beginning of a silent period or a predetermined signal comprised in the media stream, from the search window which may extend in time in both directions from the arrival of metadata signal 240. For example, device 110 may buffer the media stream in a memory comprised in device 110 prior to playback, and responsive to metadata signal 240 search for the timing cue in the buffer. Likewise, device 110 may wait for some more of the media stream to arrive to enable searching in the media stream after arrival of metadata signal 240. Detecting a beginning of a silent period may comprise determining that an energy level of the media stream declines below a threshold for at least a certain length of time.

In FIG. 2A, metadata signal 240 is received in device 110 before section 220 begins. However, the beginning of section 220 is within search window 250 initialized by the arrival of metadata signal 240, and device 110 may begin inserting the insertable content item from the start of section 220, triggered by the timing cue that occurs at the start of section 220.

In FIG. 2B, metadata signal 240 is received in device 110 after section 220 begins. However, the beginning of section 220 is within search window 250 initialized by the arrival of metadata signal 240, and device 110 may begin inserting the insertable content item from the start of section 220, triggered by the timing cue that occurs at the start of sections 220. In this case, device 110 will find the timing cue from data comprised in the media stream that is stored in the buffer in device 110 at the time metadata signal 240 arrives, and device 110 can cause the insertion of the insertable content item to begin in time so no gap is perceptible in playback in a transition from section 210 to the insertable content item.

In FIG. 2C, metadata signal 240 is received in device 110 before section 220 begins. In this case, metadata signal 240 arrives at device 110 so early, that search window 250 expires before the timing cue at the beginning of section 220 is determined. Device 110 may be configured to, in such a case, refrain from inserting any insertable content item. This may prove useful in case device 110 mis-detects metadata signal 240, in other words in case metadata detection in device 110 produces a false positive and no section 220 in fact is forthcoming associated with metadata signal 240. Another alternative is a case where a malicious party transmits counterfeit metadata signals 240 to hinder delivery of the media stream to consumers.

The length of search window 250 may be dynamically adjustable. For example, device 110 may select a length for search window based at least in part on a connection device 110 uses. For example, where the connection type has larger jitter, meaning that a delay in conveying messages over a communication path comprising a connection is not constant, search window 250 may be larger. Conversely, where jitter is lower, in other words the connection type is such that delay is relatively stable, search window 250 may be shorter in length. As another example, a connection type associated with higher delay overall may cause device 110 to employ a larger search window 250, and conversely a connection type associated with lower delays overall may cause device 110 to employ a search window 250 of shorter length.

In some embodiments, the length of search window 250 is selected at least in part based on historical data. In these embodiments, device 110 stores information on previous timing differences between metadata signals and timing cues. In these cases, device 110 may select a length of search window 250 so as to cover the average timing difference plus a margin, for example, 30% or a configurable margin. The search window may also be asymmetrically arranged around the arrival time of metadata signal 240, for example where device determines based on previous timing differences that on average the timing cue has been determined 24 milliseconds, ms, after the metadata signal, the search window may extend from 10 ms before metadata signal 240 to 30 ms after metadata signal 240. In general the search window may be characterized by two time parameters, t1 and t2. Parameter t1 may denote how long the search window is in the direction before arrival of metadata signal 240, and parameter t2 may denote how long the search window is in the direction after arrival of metadata signal 240. The case t1=t2 corresponds to a search window that is symmetrically arranged around metadata signal 240.

In some embodiments, device 110 is configured to determine whether the metadata signal comprises a valid cryptographic token from server 150 or another party and select a length of the search window in at least in part in dependence thereof. For example, at least part of the contents of the metadata signal may be cryptographically signed with a private key, where device 110 is in possession of a corresponding public key. The signed part may comprise a timestamp to prevent copying of metadata signals, device 110 being configured to discard metadata signals with a timestamp not substantially matching a current time. In case device 110 can confirm a cryptographic token is valid, device 110 may search the entire buffer, and an extended time after arrival of the metadata signal, for the timing cue. This is since it is much more likely the metadata signal is genuine and transmitted in good faith. For example, device 110 may search the entire buffer and extend a search buffer it would otherwise use to double the length in the future direction. Responsive to determining a non-valid cryptographic token is comprised in metadata signal 240, device 110 may discard the metadata signal, or search a search window 250 that is narrower than normal around the arrival time of the metadata signal.

Metadata signal 240 may be conveyed to device 110 over the same connection as is used to convey the media stream, or alternatively over a different connection. For example, the media stream may be received from a digital radio broadcast and the metadata signals may be received over a cellular interface, for example LTE. In other embodiments, metadata signal 240 may be received over the same connection as the media stream, or even embedded in the media stream.

In general, metadata signal 240 may comprise at least one of an identifier of the media stream, an identifier of device 110, and identifier of a user of the device 110 and an identifier of a subscription associated with device 110. An identifier of the media stream may comprise, for example, a hash of a file of the media stream or an identifier of the media stream within a naming convention of a node originating the media stream. An identifier of device 110 may comprise, for example, an international mobile station equipment identity, IMEI, where device 110 comprises cellular mobile capability, or a serial number. An identifier of a user may comprise a name or social security number, for example. An identifier of a subscription may comprise a cookie hash or a telephone number, for example, depending on the embodiment. One or mode identifiers in metadata signal 240 may be useful where metadata signal 240 is received in device 110 over a connection that is not used to convey the media stream, for example, to render explicit a connection between the media stream and metadata signal 240. Identifiers also enable management of metadata issuance centrally, allowing more organized coordination of use of insertion opportunities and/or content overwriting.

Although discussed above as metadata signal 240, in general search window 250 may be initialized by a timing cue, which need not be a metadata signal in particular. For example, program-guide information, silence or a predefined content sequence in the media stream can act as triggers for initialization of search window 250. Likewise, instead of silence a predefined content sequence in the media stream can be sought for in search window 250, to identify a location where to start inserting the insertable content item. Since silence can temporarily occur in a media stream also for reasons not connected with inserting content items, a predefined content sequence can be useful in this regard.

In some embodiments, where the insertable content item comprises an audio content item, there may be an associated visual content. The associated visual content may be displayed on a screen comprised in device 110 during playback of the inserted insertable content item. The associated visual content may be a still image or a video clip, for example. In some embodiments, the associated visual content comprises user interface control elements. Responsive to a user activating such a user interface control element, an event related to the predetermined content may be configured to occur. For example, the user interface control element may comprise a link to a web page, and activating the link may thus cause a web browser to be launched and/or directed to the web page concerned.

Detecting the end of section 220 may be accomplished by detecting an end of silence, or alternatively by detection of a predetermined content sequence in the media stream. This predetermined content sequence may be a different predetermined content sequence than one used to detect beginning of section 220, in embodiments where a predetermined content sequence is used, at least on part, to detect the beginning of section 220.

In some embodiments of the invention, the end of section 220 is detected instead of, or in addition to, the beginning. Detecting the end may be based on considerations similar to those described above in connection with detecting the beginning. For example, the end may be detected based on metadata and detecting the end of section 220, in detail metadata or another timing cue may initialize a search window, which will then be searched for the end of section 220. In these embodiments, once the end of section 220 is discovered in the search window, a content item may be inserted so that the insertion ends at the end of section 220.

Figure 3:
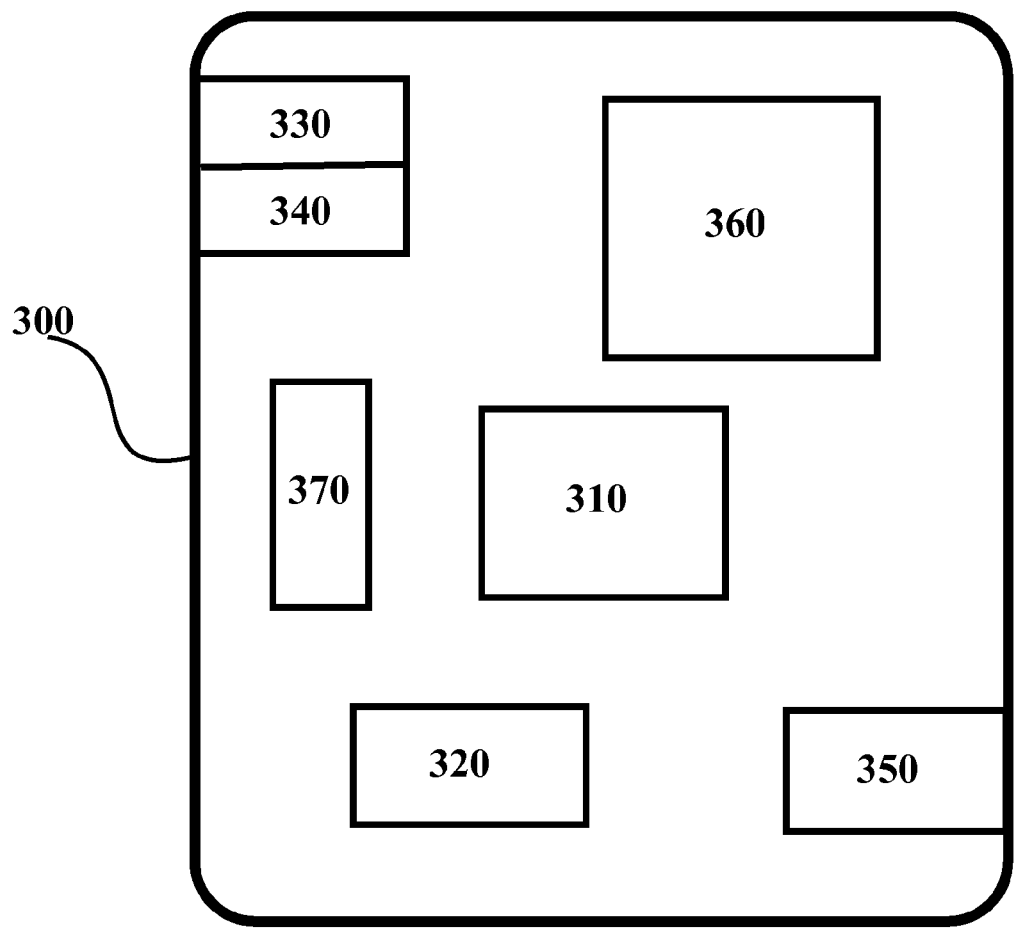
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a communication device such as device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
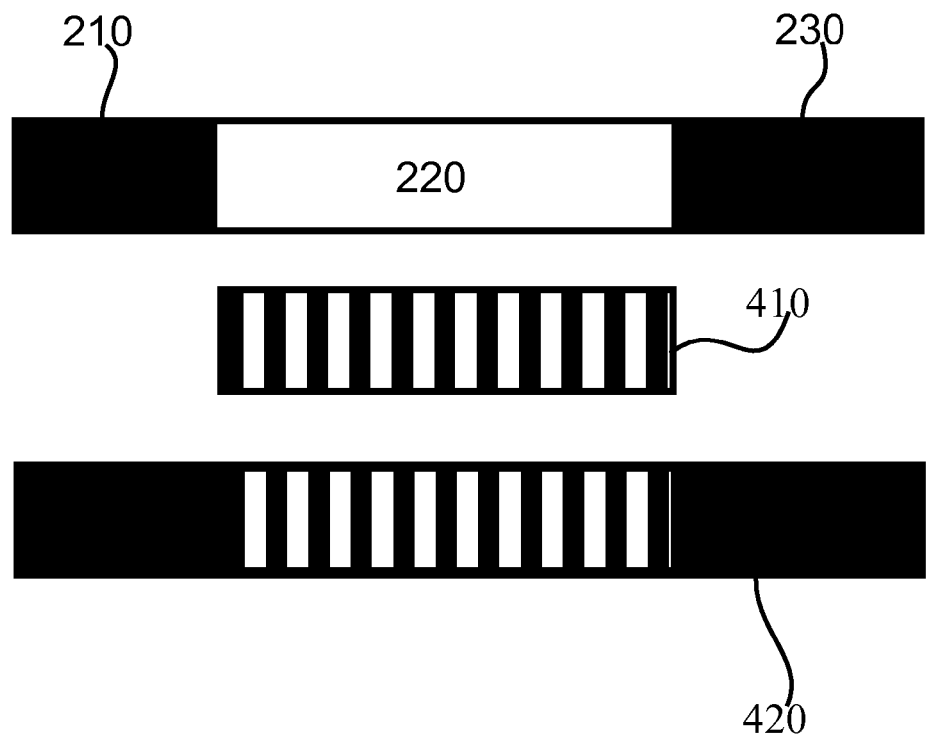
FIG. 4 illustrates insertion of a content item into a media stream.

FIG. 4 illustrates insertion of a content item into a media stream. Sections 210, 220 and 230 correspond to like sections in FIGS. 2A-2C. Section 410 is a predetermined content item, which may be stored in device 110, for example. Modified media stream 420 comprises sections 210 and 230, and content item 410 inserted between sections 210 and 230, to overwrite and replace section 220 in the original media stream. It is the modified media stream 420 that is played by device 110.

Figure 5:
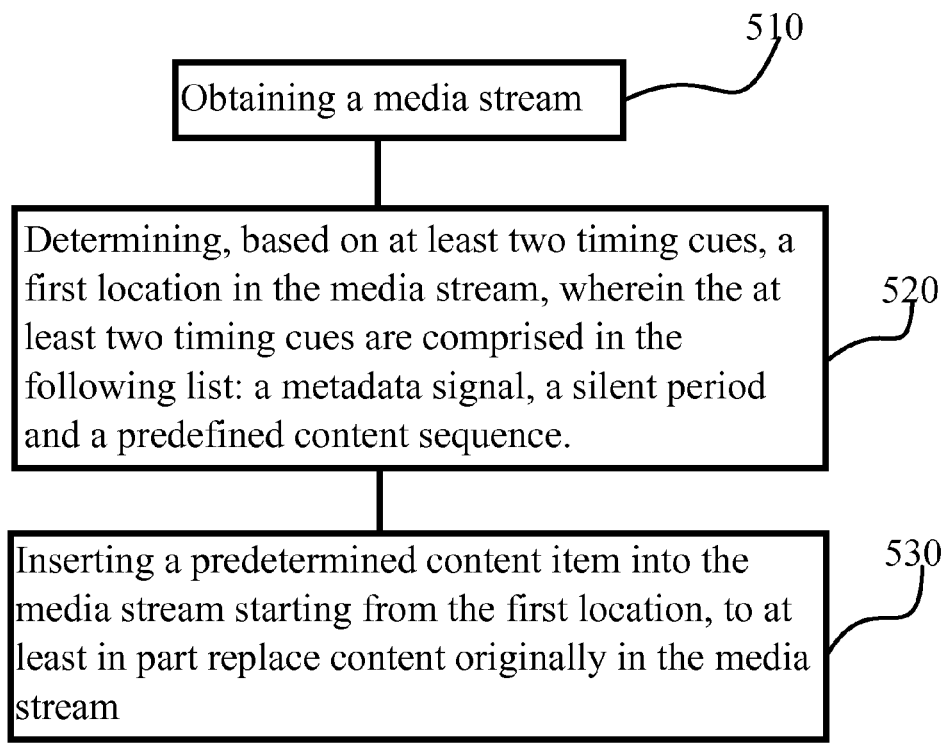
FIG. 5 is a flow graph of a method in accordance with at least some embodiments of the present invention.

FIG. 5 is a flow graph of a method in accordance with at least some embodiments of the present invention. The phases of the illustrated method may be performed in device 110, for example. Phase 510 comprises obtaining a media stream. Phase 520 comprises determining, based on at least two timing cues, a first location in the media stream, wherein the at least two timing cues are comprised in the following list: a metadata signal, a silent and a predefined content sequence. The metadata signal may be associated with the media stream. The silent period may comprise a silent period in the media stream. The predefined content sequence may be comprised in the media stream. Phase 520 comprises inserting a predetermined content item into the media stream starting from the first location, to at least in part replace content originally in the media stream. In the illustrated method, in case the metadata signal is comprised in the at least two timing cues, the first location may occurs at most a threshold length of time before or after receipt of the metadata signal.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:
1. An apparatus comprising:
a receiver configured to obtain a media stream;
at least one processing core configured to determine, based on at least two timing cues, a first location in the media stream, wherein the at least two timing cues are comprised in the following list: a metadata signal associated with the media stream, a silent period in the media stream and a predefined content sequence in the media stream, and to insert a predetermined content item into the media stream starting from or ending in the first location, to at least in part replace content originally in the media stream,
wherein in case the metadata signal is comprised in the at least two timing cues, the first location occurs at most a threshold length of time before or after receipt of the metadata signal, and
the at least one processing core is configured to select dynamically a value for the threshold length of time in dependence of at least one of the following: stored information concerning a time span between metadata and insertion locations in the media stream in the past, and a type of connection.

2. The apparatus of claim 1, wherein the media stream is obtained as output from a media stream decoder.

3. The apparatus of claim 1, wherein the metadata signal comprises at least one of an identifier of the media stream, an identifier of the apparatus, and identifier of a user of the apparatus and an identifier of a subscription associated with the apparatus.

4. The apparatus of claim 1, wherein the at least one processing core is configured to select the value for the threshold length of time at least in part in dependence of at least one of the following: stored information concerning a time span between metadata and insertion locations in the media stream in the past, presence of a valid cryptographic token in the metadata signal, an indicator comprised in the metadata signal and a connection type.

5. The apparatus of claim 1, wherein the at least one processing core is further configured to cause storing of the predetermined content item in the apparatus.

6. The apparatus of claim 1, wherein the apparatus is further configured to buffer the media stream, and to determine the first location in a buffered section of the media stream.

7. The apparatus of claim 1, wherein the apparatus is further configured to extract the metadata from the media stream during decoding.

8. A method comprising:
obtaining a media stream;
receiving a metadata signal associated with the media stream, and responsive to the metadata signal determining whether a timing cue can be determined, the timing cue being comprised in the following list: a silent period in the media stream and a predefined content sequence in the media stream, and
inserting a predetermined content item into the media stream starting from or ending in a point in the media stream corresponding to the timing cue, to at least in part replace content originally in the media stream responsive to the timing cue being determined and refraining from inserting the predetermined content item responsive to the timing cue not being determined,
wherein, if determined, the timing cue occurs in the media stream at most a threshold length of time before or after receipt of the metadata signal, and selecting dynamically a value for the threshold length of time in dependence of at least one of the following: stored information concerning a time span between metadata and insertion locations in the media stream in the past and a type of connection.

9. A non-transitory computer readable medium having stored thereon a set of computer readable instructions that, when executed by at least one processor, cause an apparatus to at least:

obtain a media stream;
determine, based on at least two timing cues, a first location in the media stream, wherein the at least two timing cues are comprised in the following list: a metadata signal associated with the media stream, a silent period in the media stream and a predefined content sequence in the media stream, and insert a predetermined content item into the media stream starting from or ending in the first location, to at least in part replace content originally in the media stream;
wherein in case the metadata signal is comprised in the at least two timing cues, the first location occurs at most a threshold length of time before or after receipt of the metadata signal, and
select dynamically a value for the threshold length of time in dependence of at least one of the following: stored information concerning a time span between metadata and insertion locations in the media stream in the past, and a type of connection.

10. The non-transitory computer readable medium of claim 9, wherein the set of computer readable instructions, when executed by the at least one processor, further causes the apparatus to obtain the media stream as output from a media stream decoder.

11. The non-transitory computer readable medium of claim 9, wherein the metadata signal comprises at least one of an identifier of the media stream, an identifier of the apparatus, and identifier of a user of the apparatus and an identifier of a subscription associated with the apparatus.

12. The non-transitory computer readable medium of claim 9, wherein the set of computer readable instructions, when executed by the at least one processor, further causes the apparatus to select the value for the threshold length of time at least in part in dependence of at least one of the following: stored information concerning a time span between metadata and insertion locations in the media stream in the past, presence of a valid cryptographic token in the metadata signal, an indicator comprised in the metadata signal and a connection type.

13. The non-transitory computer readable medium of claim 9, wherein the set of computer readable instructions, when executed by the at least one processor, further causes the apparatus to store the predetermined content item in the apparatus.

14. The non-transitory computer readable medium of claim 9, wherein the set of computer readable instructions, when executed by the at least one processor, further causes the apparatus to buffer the media stream, and to determine the first location in a buffered section of the media stream.

15. The non-transitory computer readable medium of claim 9, wherein the set of computer readable instructions, when executed by the at least one processor, further causes the apparatus to extract the metadata from the media stream during decoding.

* * * * *